(12) United States Patent
Ibayashi et al.

(10) Patent No.: US 11,181,215 B2
(45) Date of Patent: Nov. 23, 2021

(54) PIPE JOINT

(71) Applicant: Hitachi Metals, Ltd., Tokyo (JP)

(72) Inventors: Makoto Ibayashi, Kuwana (JP); Yoshinori Yoshida, Kuwana (JP); Takashi Toku, Kuwana (JP); Takaaki Inotani, Kuwana (JP)

(73) Assignee: Hitachi Metals, Ltd., Tokyo (JP)

( * ) Notice: Subject to any disclaimer, the term of this patent is extended or adjusted under 35 U.S.C. 154(b) by 372 days.

(21) Appl. No.: 15/551,438

(22) PCT Filed: Feb. 19, 2016

(86) PCT No.: PCT/JP2016/000893
§ 371 (c)(1),
(2) Date: Aug. 16, 2017

(87) PCT Pub. No.: WO2016/132745
PCT Pub. Date: Aug. 25, 2016

(65) Prior Publication Data
US 2018/0038533 A1   Feb. 8, 2018

(30) Foreign Application Priority Data

Feb. 19, 2015 (JP) .............................. JP2015-031089

(51) Int. Cl.
| | | |
|---|---|---|
| *F16L 33/24* | (2006.01) | |
| *F16L 33/26* | (2006.01) | |
| *F16L 33/22* | (2006.01) | |
| *F16L 25/00* | (2006.01) | |

(52) U.S. Cl.
CPC .............. *F16L 33/24* (2013.01); *F16L 33/26* (2013.01); *F16L 25/0036* (2013.01); *F16L 33/227* (2013.01)

(58) Field of Classification Search
CPC ....... F16L 33/24; F16L 33/26; F16L 25/0036; F16L 33/227; F16L 27/11; F16L 27/111; F16L 51/02
USPC ...................... 285/222.5, 903, 226, 353, 354
See application file for complete search history.

(56) References Cited

U.S. PATENT DOCUMENTS

| | | | | |
|---|---|---|---|---|
| 4,674,775 A * | 6/1987 | Tajima | ................ | F16L 25/0036 285/903 |
| 4,801,158 A * | 1/1989 | Gomi | .................. | F16L 25/0036 285/903 |
| 5,423,578 A * | 6/1995 | Kanomata | ........... | F16L 25/0036 285/903 |
| 5,441,312 A | 8/1995 | Fujiyoshi et al. | | |

(Continued)

FOREIGN PATENT DOCUMENTS

| | | |
|---|---|---|
| CN | 101382220 A | 3/2009 |
| JP | 7-151279 | 6/1995 |

(Continued)

*Primary Examiner* — Matthew Troutman
*Assistant Examiner* — William S. Choi
(74) *Attorney, Agent, or Firm* — DLA Piper LLP (US)

(57) ABSTRACT

A pipe joint includes a hollow joint main body; a nut that is screwed into the joint main body; a seal member that is mounted to inside of the joint main body; and a retainer that is placed between the joint main body and the nut and comprises a pawl portion engaged with a trough of a metal flexible pipe in a coupled state and a retainer locking portion caught and locked inside of the joint main body in the coupled state.

8 Claims, 25 Drawing Sheets

(56) References Cited

U.S. PATENT DOCUMENTS 6,502,866 B1 * 1/2003 Hujisawa ............ F16L 25/0036
  285/903
7,690,693 B2 * 4/2010 Moner ................ F16L 25/0036
  285/903
9,182,061 B2 * 11/2015 Hamaguchi

FOREIGN PATENT DOCUMENTS

JP  2004-3535  1/2004
JP  2004003535 A  *  1/2004

* cited by examiner

PIPE JOINT

TECHNICAL FIELD

This disclosure relates to a pipe joint connected to a metal flexible pipe in which a fluid such as city gas flows.

BACKGROUND

A metal flexible pipe provided by coating a metal pipe formed in a bellows-like outer shape with a resin such as soft polyvinyl chloride is widely used for piping of the city gas or the like. In the case of piping the metal flexible pipe indoors, for example, the metal flexible pipe connects to a gas appliance such as a gas cooker via a pipe joint for metal flexible pipe. There are following two types (1) and (2) of the pipe joint for metal flexible pipe:

(1) screw connection type: a pipe joint that includes a nut, a joint main body and a retainer member and that is coupled with the metal flexible pipe by screwing the nut into the joint main body; and (2) fingertip connection type: a pipe joint that is coupled with the metal flexible pipe by simply inserting the metal flexible pipe into the pipe joint.

Examples of the screw connection-type pipe joint include a pipe joint described in JP H07-151279A and a pipe joint shown in FIG. 5. A pipe joint 1A shown in FIG. 5 includes a hollow joint main body 2A, a nut 3A screwed into an end of the joint main body 2A, a seal member 4A mounted to the joint main body 2A such that an end of a metal flexible pipe P abuts against the seal member 4A, and a retainer 6A mounted between the joint main body 2A and the nut 3A. When the nut 3A is screwed into the joint main body 2A, the diameter of the retainer 6A is reduced, and a pawl portion included in the retainer 6A is received in a trough of the metal flexible pipe P. A leading end of the flexible pipe P is then pressed against the seal member 4A by an end face of the retainer 6A, so that the pipe joint 1A is coupled with the metal flexible pipe P. That type of pipe joint has a less number of components and a simple structure and is thus inexpensive. The fingertip connection-type pipe joint, on the other hand, has a greater number of components and is accordingly expensive. The fingertip connection-type pipe joint is, however, connectable to the metal flexible pipe by simply inserting the metal flexible pipe into the pipe joint and has extremely excellent workability.

The screw connection-type pipe joint shown in FIG. 5 is coupled with the metal flexible pipe by screwing the nut into the joint main body as described above. Loosening the nut releases the locking by the retainer and readily releases coupling of the metal flexible pipe. In other words, coupling of the metal flexible pipe with the pipe joint is readily releasable by anyone's simple operation. This may cause a problem in terms of maintaining the safety of gas piping. There is accordingly a demand for a pipe joint that does not allow the coupled state of the metal flexible pipe with the pipe joint to be readily released after completion of coupling.

It could therefore be helpful to provide a screw connection-type pipe joint that suppresses coupling of a metal flexible pipe with the pipe joint from being readily released after completion of the coupling.

SUMMARY

We thus provide:

A pipe joint coupled to a metal flexible pipe. This pipe joint comprises a hollow joint main body; a nut screwed into the joint main body; a seal member mounted to inside of the joint main body; and a retainer placed between the joint main body and the nut. The retainer comprises a pawl portion that is engaged with a trough of the metal flexible pipe in a coupled state that the metal flexible pipe is coupled with the pipe joint by further screwing the nut into the joint main body; and a retainer locking portion that is caught and locked inside of the joint main body in the coupled state.

The retainer may include the retainer locking portion that is caught and locked inside of the joint main body in the coupled state. This configuration enables the retainer and the joint main body to be caught and locked by each other in the coupled state and thereby provides the securer coupling compared with the prior art pipe joint. Once coupling of the metal flexible pipe with the pipe joint is completed, the retainer locking portion is caught and locked inside of the joint main body. Even when the nut is loosened, this configuration maintains the state that the retainer and the joint main body are caught and locked by each other and suppresses coupling of the metal flexible pipe with the pipe joint from being released. The "trough of the metal flexible pipe" means an entire portion of the metal flexible pipe that is continuous with a portion having a maximum outer diameter (crest) of the metal flexible pipe and has a smaller outer diameter than the outer diameter of the crest. The description of "being engaged with the trough" means engaging with the trough described above.

A locking groove may be formed in an inner circumferential surface of the joint main body, and the retainer locking portion may be configured as a convex portion that is caught and locked in the locking groove in the coupled state.

In the coupled state, the convex portion formed on an outer surface of the retainer, i.e., the retainer locking portion may be caught and locked in the locking groove formed in an inner surface of the joint main body. This configuration fixes the retainer to the joint main body and thereby securely maintains the coupled state of the metal flexible pipe. The convex portion may be formed around the whole circumference on the outer surface of the retainer or may include a plurality of convexes provided along the circumferential direction on the outer surface of the retainer.

The retainer locking portion may be caught and locked in a locking groove that is formed in an inner surface of the joint main body in the coupled state. The retainer may have a central axis line common with the joint main body and provide an annular appearance shape that forms at least part of an entire circumference in a circumferential direction about the central axis line. The retainer may comprise a leading end portion that is located on a leading end side along a screwing direction in which the nut is screwed into the joint main body and that includes the pawl portion and the retainer locking portion; and a rear end portion that is located on a rear end side along the screwing direction. The retainer may also comprise a groove formed in at least part of the entire circumference on an outer circumferential surface side to be located between the leading end portion and the rear end portion along the screwing direction and to be recessed in a depth direction that is an orthogonal direction orthogonal to the screwing direction.

The groove may be formed in at least part of the entire circumference on the outer circumferential surface side of the retainer to be located between the leading end portion and the rear end portion along the screwing direction and to be recessed in the depth direction that is the orthogonal direction orthogonal to the screwing direction. This configuration reduces the rigidity between the leading end portion and the rear end portion, compared with a configuration without formation of such a groove. This configuration accordingly reduces the resistance during insertion of the metal flexible pipe into the pipe joint even when the inner diameter of the pawl portion is decreased with a view to suppressing the metal flexible pipe from being disconnected from the pipe joint. This configuration thus improves the insertability of the metal flexible pipe into the pipe joint, while suppressing coupling of the metal flexible pipe with the pipe joint from being released.

The retainer locking portion may be caught and locked in a locking groove that is formed in an inner surface of the joint main body in the coupled state. The retainer may have a central axis line common with the joint main body and provide an annular appearance shape that forms at least part of an entire circumference in a circumferential direction about the central axis line. The retainer may comprise a leading end portion that is located on a leading end side along a screwing direction in which the nut is screwed into the joint main body and that includes the pawl portion and the retainer locking portion; a rear end portion that is located on a rear end side along the screwing direction; and a connecting portion that is located between the leading end portion and the rear end portion along the screwing direction such as to connect the leading end portion with the rear end portion. A distance from the central axis line to an outer diameter end of the leading end portion may be longer than a distance from the central axis line to an outer diameter end of the rear end portion. With regard to at least part of the connecting portion along the screwing direction, a distance from the central axis line to an outer diameter end of the connecting portion may be shorter than the distance from the central axis line to the outer diameter end of the rear end portion.

With regard to at least part of the connecting portion along the screwing direction, the distance from the central axis line to the outer diameter end of the connecting portion may be shorter than the distance from the central axis line to the outer diameter end of the rear end portion. This configuration reduces the thickness of the connecting portion (makes the connecting portion thinner), compared with a configuration that this distance is equal to or longer than the distance from the central axis line to the outer diameter end of the rear end portion and thereby reduces the rigidity of the connecting portion.

The thickness of the connecting portion along an orthogonal direction that is orthogonal to the screwing direction may be uniform along the screwing direction, and an inner diameter of the connecting portion may decrease along the screwing direction toward a leading end side.

The thickness of the connecting portion along the orthogonal direction may be uniform along the screwing direction. This configuration suppresses a stress from being concentrated in a specific region of the connecting portion in the process of coupling the metal flexible pipe with the pipe joint. This configuration accordingly suppresses damage of the retainer. This configuration also enables the thickness of the connecting portion in the orthogonal direction to be a uniform, smallest possible thickness in a processible range and minimizes the rigidity of the connecting portion in a processible range.

The thickness of the connecting portion in the orthogonal direction may be equal to a thickness of the rear end portion in the orthogonal direction.

The thickness of the connecting portion in the orthogonal direction may be equal to the thickness of the rear end portion in the orthogonal direction. This configuration suppresses a stress from being concentrated in a specific region from the rear end portion to the connecting portion or more specifically in a region having the smaller thickness in the orthogonal direction than the remaining region in the process of coupling the metal flexible pipe with the pipe joint. This configuration accordingly suppresses damage of the retainer.

A leading end of the connecting portion along the screwing direction may be continuous with an edge portion of the leading end portion on a side near to the central axis line along the orthogonal direction.

The leading end of the connecting portion along the screwing direction may be continuous with the edge portion of the leading end portion on the side near to the central axis line along the orthogonal direction. This configuration further increases the size (volume) of a groove formed in the retainer between the leading end portion and the rear end portion along the screwing direction, compared with a configuration that the leading end of the connecting portion along the screwing direction is continuous with a portion different from the edge portion of the leading end portion on the side near to the central axis line along the orthogonal direction. This configuration accordingly further reduces the rigidity of the retainer.

The retainer and the nut may be assembled to and integrated with each other before the nut is further screwed into the joint main body.

The retainer and the nut may be assembled to and integrated with each other before the nut is crewed into the joint main body. This configuration suppresses a positional misalignment of the retainer, for example, when the orientation of the nut is changed in the process of screwing the nut into the joint main body. This configuration accordingly reduces the labor required for the operation of coupling the metal flexible pipe with the pipe joint and shortens the operation time. Additionally, the configuration that the retainer and the nut are assembled to and integrated with each other before the nut is crewed into the joint main body suppresses the occurrence of a mounting failure of the retainer and an assembling error of the retainer in the process of screwing the nut into the joint main body.

The joint main body may include a body locking portion, and the nut may include a nut locking portion. The body locking portion and the nut locking portion may be caught and locked by each other in the coupled state.

The joint main body and the nut may respectively include the body locking portion and the nut locking portion that are caught and locked by each other in the coupled state. This enables the joint main body and the nut to be caught and locked by each other in the coupled state and to be securely fixed to each other. This configuration suppresses the nut from being loosened from the joint main body and further reduces the risk that coupling of the metal flexible pipe and the pipe joint is released.

REFERENCE SIGNS LIST

Figure 1:
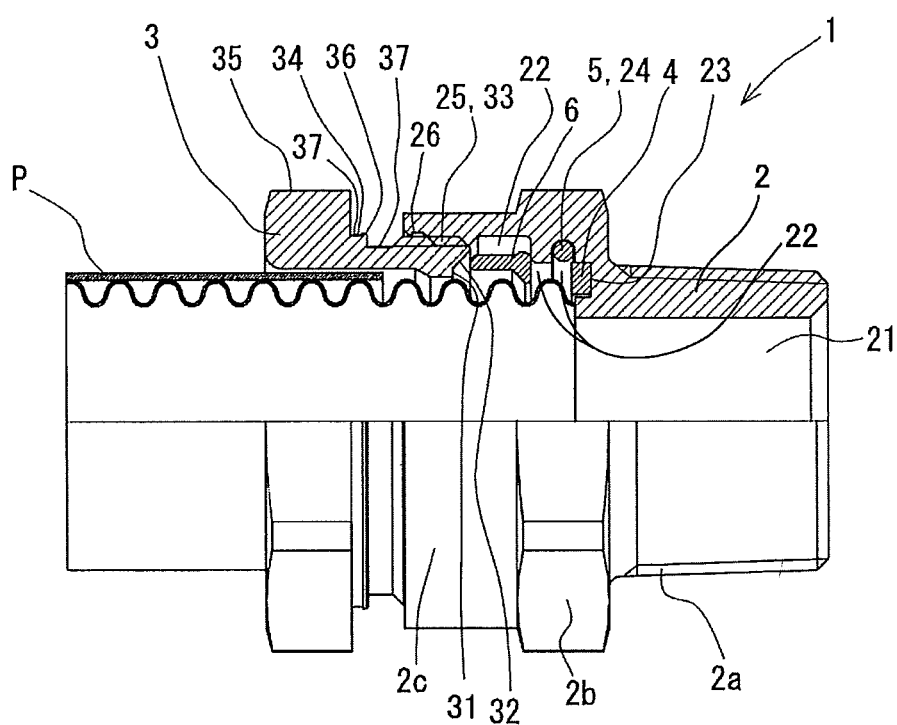
FIG. 1 is a sectional view illustrating the state that a metal flexible pipe is inserted into a pipe joint according to a first example.

1: pipe joint,
2: joint main body, 2a: male threaded portion, 2b: tool hooking portion, 2c: cylindrical portion, 21: flow path, 22: large diameter portion, 23: groove, 24: locking groove, 25: female threaded portion, 26: body locking portion,
3: nut, 31: end face, 32: tapered surface, 33: male threaded portion, 34: step, 35: tool hooking portion, 36: nut locking portion, 37: indicator portion
4: seal member
5: fireproof packing
6: retainer, 61: straight portion, 62: tapered portion, 53: pawl portion, 64: convex portion
100: pipe joint, 160: retainer, 161: rear end portion, 162: connecting portion, 163: pawl portion, 164: retainer locking portion, 165: standing portion, 166: leading end portion, 167: groove, 169: tapered surface,
200: pipe joint, 260: retainer, 261: rear end portion, 262: connecting portion, 263: pawl portion, 264: retainer locking portion, 265: standing portion, 266: leading end portion, 267: groove, 271: tapered surface, 272: tapered surface 300: pipe joint
3a: nut
CX1: central axis line, CX2: central axis line
D1: screwing direction
P: metal flexible pipe

DETAILED DESCRIPTION

A. First Example

A1. Configuration of Pipe Joint

The configuration and the functions of a pipe joint according to an example of the disclosure are described with reference to drawings. A pipe joint 1 of the example is coupled with a metal flexible pipe P in use. As shown in FIG. 1, the pipe joint 1 includes a hollow joint main body 2, a nut 3 screwed into the joint main body 2, a seal member 4 mounted to inside of the joint main body to seal the metal flexible pipe P and the joint main body 2, a fireproof packing 5, and a retainer 6 configured to retain the metal flexible pipe P in the state that the pipe joint 1 and the metal flexible pipe P are coupled with each other (hereinafter called "coupled state"). The state illustrated in FIG. 1 indicates a state prior to the coupled state or in other words, a state in which the joint main body 2 and the nut 3 are temporarily assembled. The state of temporary assembling shown in FIG. 1 is changed to the coupled state by further screwing the nut 3 into the joint main body 2. All the joint main body 2, the nut 3, the seal member 4 and the fireproof packing 5 described above have tubular or annular appearance shapes having a common central axis line. This central axis line is also identical with a central axis line of the metal flexible pipe P in the state that the pipe joint 1 is coupled with the metal flexible pipe P.

The details of the respective components are described below. The joint main body 2 is a hollow member with a flow path 21 formed inside thereof to cause a fluid to flow through. A male threaded portion 2a configured to provide a screwed joint with a device or the like, a tool hooking portion 2b configured to allow a tool for screwing to be placed thereon, and a cylindrical portion 2c are formed on an outer periphery of the joint main body 2. The flow path 21 and a large diameter portion 22 configured to receive the respective members placed therein are formed, on the other hand, on an inner periphery of the joint main body 2 to be arranged sequentially from the male threaded portion 2a-side. A groove 23 is formed in the large diameter portion 22 to be recessed in an annular shape in a bottom thereof which an end of the coupled metal flexible pipe P abuts against. An inner surface of the large diameter portion 22 is formed such as to increase the inner diameter thereof as a step from a depth side thereof, and a locking groove 24 in an annular shape is formed in the step on the depth side of the large diameter portion 22. A female threaded portion 25 is also formed on an inner circumference of the joint main body 2 toward an end portion thereof. A body locking portion 26 is formed on the further end portion side as a groove recessed in an annular shape.

The nut 3 is a hollow member which the coupled flexible pipe P is inserted in, and is screwed into the joint main body in use. In the description below, a screwing direction of the nut 3, i.e., a rightward direction of FIG. 1 (direction from the nut 3 toward the joint main body 2) is simply called "screwing direction". An end face 31 that is perpendicular to the central axis line and a tapered surface 32 that is tapered to increase the diameter from the end face 31 toward its main body side are formed on an end portion of the nut 3 in the screwing direction. A male threaded portion 33, a step 34 and a tool hooking portion 35 are formed on an outer circumference of the nut 3 to be arranged sequentially from its end portion in the screwing direction. A nut locking portion 36 in a convex shape is formed on the step 34 to be tapered in the screwing direction. An indicator portion 37 that is colored with, for example, a red dye, is placed between the male threaded portion 33 and the tool hooking portion 35. The nut 3 is assembled by screwing the male threaded portion 33 into the female threaded portion 25 of the joint main body 2.

The seal member 4 is a ring-shaped plate-like member formed from an elastic member and is fit in and mounted to inside of the groove 23 of the joint main body 2. The seal member 4 is made of a material having elasticity (for example, a rubber material such as nitrile rubber (NBR)).

The fireproof packing 5 is a ring-shaped member having a circular cross section and is mounted to the locking groove 24 of the joint main body 2. The fireproof packing 5 is made of a material that is expanded in volume at high temperatures due to, for example, a fire (for example, a nitrile rubber (NBR) mixed with expanded graphite).

Figure 2:
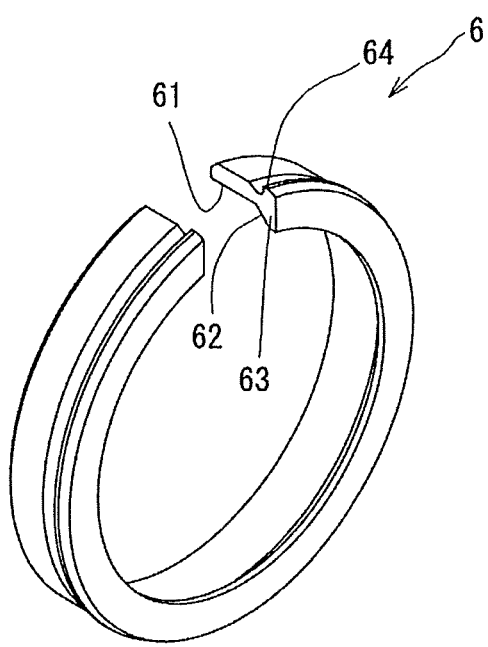
FIG. 2 is a perspective view illustrating a retainer.

As shown in FIG. 2, the retainer 6 is an annular member having a cut portion in its circumferential direction. As shown in FIG. 1, a large diameter straight portion 61 that has a larger diameter than the outer diameter of the metal flexible pipe P and a tapered portion 62 that is tapered to reduce the diameter from the straight portion 61 toward a leading end portion are formed on an inner face of the retainer 6. According to this example, the leading end denotes an end along the screwing direction of the nut 3, i.e., an end along the rightward direction of FIG. 1 (direction from the nut 3 toward the joint main body 2). The leading end portion denotes a portion located at the leading end and its vicinity. A pawl portion 63 is formed on an inner diameter side end of the retainer 6 in the screwing direction to be engaged with a trough of the metal flexible pipe P in the coupled state. The "trough of the metal flexible pipe P" mentioned above means an entire portion of the metal flexible pipe P that is continuous with a portion having a maximum outer diameter (crest) of the metal flexible pipe P and has a smaller outer diameter than the outer diameter of the crest. The description of "being engaged with the trough" means engaging with the trough described above. A ring-shaped convex portion 64 is formed in the leading end portion in the screwing direction on an outer periphery of the retainer 6. A screwing direction side of the convex portion 64 is formed to be tapered along the screwing direction toward the leading end, and a step perpendicular to the radial direction is formed on an opposite side of the convex portion 64 that is opposite to the tapered side. As shown in FIG. 1, the retainer 6 is mounted to the large diameter portion 22 of the joint main body 2. The convex portion 64 described above corresponds to the retainer locking portion in the claims.

The following describes a procedure of coupling the metal flexible pipe P with the pipe joint 1 with reference to FIGS. 3A to 3E.

(1) Providing Pipe Joint

Figure 3A:
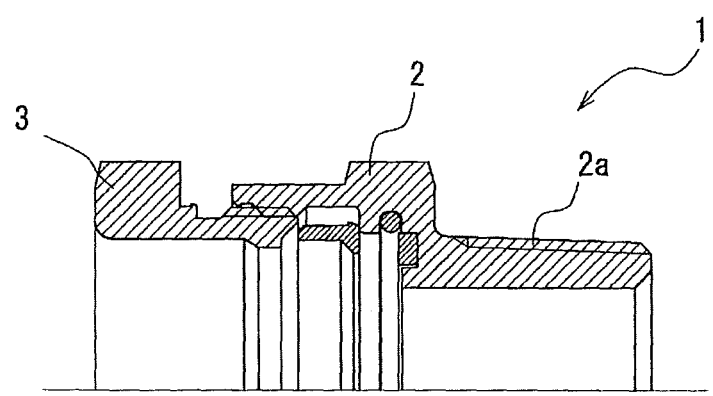
FIG. 3A is a sectional view illustrating a procedure of coupling the metal flexible pipe with the pipe joint according to the first example.

As shown in FIG. 3A, the pipe joint 1 assembled from the respective members is provided and mounted to a place where the metal flexible pipe P is laid (for example, a non-illustrated gas appliance such as a gas cooker). The pipe joint according to this example is fixed to the gas appliance by screwing the male threaded portion 2a of the joint main body 2 into a female thread formed in the gas appliance.

(2) Inserting Metal Flexible Pipe (Temporarily Coupling Metal Flexible Pipe)

Figure 3B:
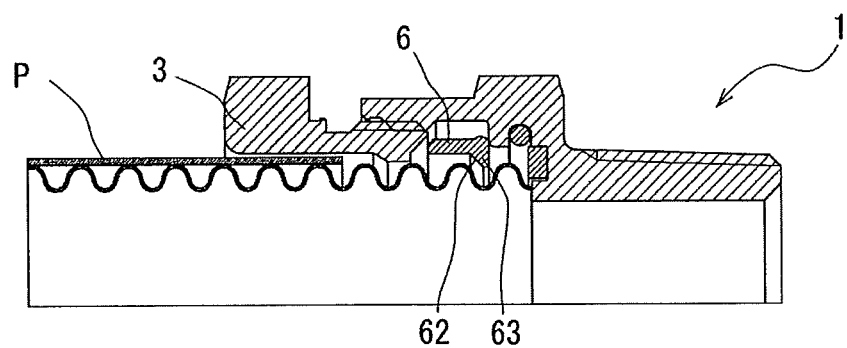
FIG. 3B is a sectional view illustrating the procedure of coupling the metal flexible pipe with the pipe joint according to the first example.

As shown in FIG. 3B, the metal flexible pipe P is inserted in a direction along the screwing direction of the nut 3 from outside of the nut 3-side of the pipe joint 1 into the pipe joint 1 that is fixed to the gas appliance. The inserted metal flexible pipe first passes through inside of the nut 3, and one crest of the leading end of the metal flexible pipe P then comes into contact with the tapered portion 62 of the retainer 6. When the metal flexible pipe P is further pressed in, one crest of the leading end of the metal flexible pipe P elastically expands the pawl portion 63 of the retainer 6 and rides over the pawl portion 63. The leading end of the metal flexible pipe P is inserted until the leading end abuts against the bottom of the joint main body 2. The operator feels a click sound and a touch when one crest of the leading end rides over the pawl portion 63, such as to be informed that the metal flexible pipe P is inserted to a desired temporary coupling position in the pipe joint 1. The metal flexile flexible pipe P is inserted manually, and an insertion force required to allow one crest of the leading end of the metal flexible pipe P to ride over the pawl portion 63 is preferably approximately 50 N to 100 N. To meet this condition of the insertion force, the inner diameter of the pawl portion 63 of the retainer 6 and the angle of the tapered portion 62 are experimentally or otherwise determined appropriately. In this stage, the operator may perform an operation of pulling the metal flexible pipe P in an opposite direction to the insertion direction (screwing direction) (hereinafter called "pulling check operation"), with a view to confirming that the crest (one crest in the above description) on the leading end side of the metal flexible pipe P rides over the pawl portion 63 and that the metal flexible pipe P is inserted such as not to readily come off from the pipe joint 1.

(3) Coupling Metal Flexible Pipe

Figure 3C:
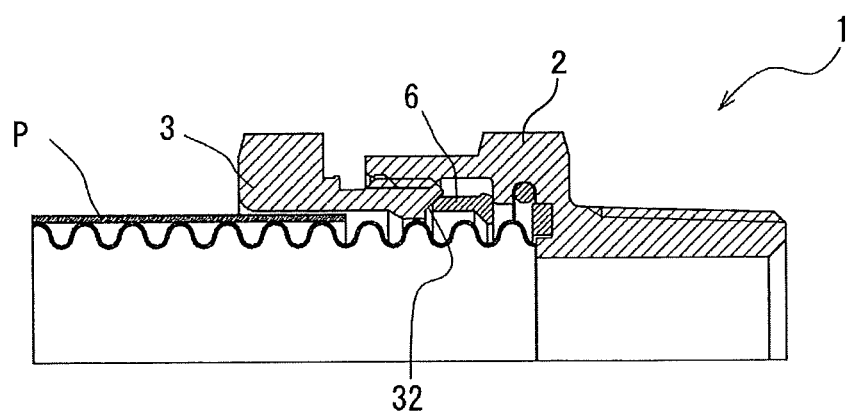
FIG. 3C is a sectional view illustrating the procedure of coupling the metal flexible pipe with the pipe joint according to the first example.
Figure 3D:
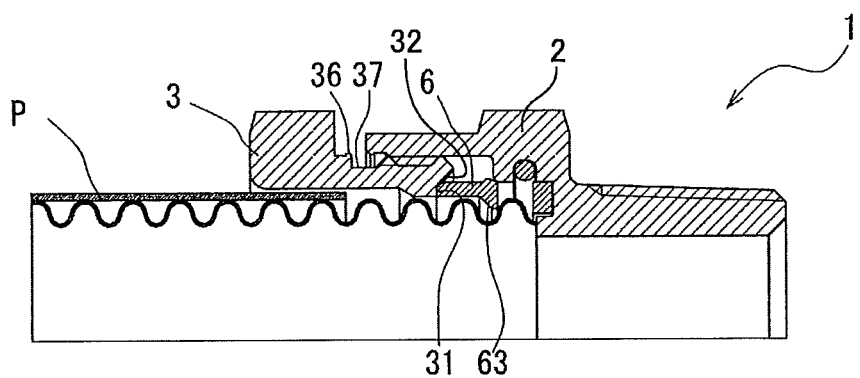
FIG. 3D is a sectional view illustrating the procedure of coupling the metal flexible pipe with the pipe joint according to the first example.
Figure 3E:
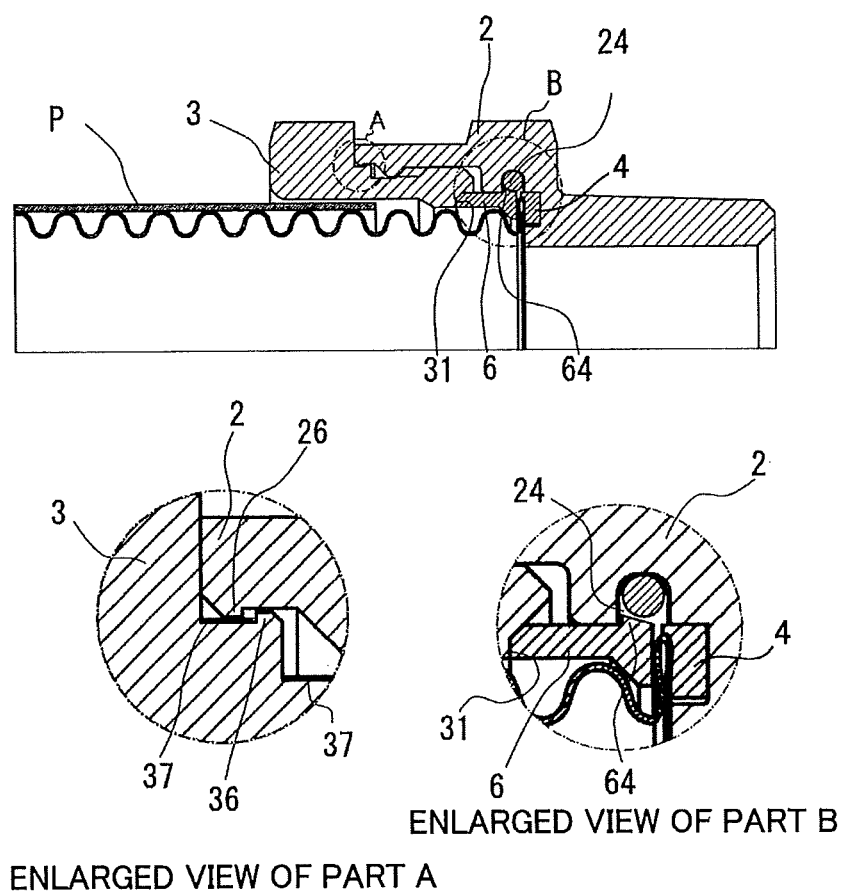
FIG. 3E is a sectional view illustrating the procedure of coupling the metal flexible pipe with the pipe joint according to the first example.

After the temporary coupling of the metal flexible pipe P, the metal flexible pipe P is coupled with the pipe joint by screwing the nut 3 into the joint main body 2. As shown in FIG. 3C, the nut 3 is first screwed in until the tapered surface 32 comes into contact with the retainer 6. When the nut 3 is further screwed in, as shown in FIG. 3D, the retainer 6 is deformed along the tapered surface 32 to reduce the diameter, and the pawl portion 63 is engaged with a first trough from the leading end of the metal flexible pipe P. As shown in FIG. 3E, when the nut 3 is further screwed in to abut against an end face of the joint main body 2, the retainer 6 is pressed in toward the depth of the joint main body by the end face 31 of the nut 3. In this state, one crest of the leading end of the metal flexible pipe P is pressed and crushed against the seal member 4 by an end face of a moving direction side of the retainer 6. As shown in an enlarged view of part B, the convex portion 64 formed on the outer circumference of the end portion of the retainer 6 is caught and locked by the locking groove 24 of the joint main body 2. The state that the retainer 6 is caught and locked by the locking groove 24 is maintained even after the nut 3 is disconnected from the joint main body 2. Once coupling of the metal flexible pipe P is completed, coupling of the metal flexible pipe P with the pipe joint 1 is not readily released.

As shown in an enlarged view of part A, when the nut 3 is screwed in to come into contact with the end portion of the joint main body 2, such as to complete coupling of the metal flexible pipe P, the nut locking portion 36 of the nut 3 and the body locking portion 26 of the joint main body 2 are caught and locked each other. This configuration prevents the nut 3 and the joint main body 2 from being readily disassembled after completion of coupling of the metal flexible pipe P. Providing both the locking structure of the retainer 6 with the joint main body 2 and the locking structure of the nut 3 with the joint main body 2 as described above more effectively reduces the potential risk that coupling of the metal flexible pipe is released.

When the nut 3 is screwed in to come into contact with the end portion of the joint main body 2, such as to complete coupling of the metal flexible pipe P, the indicator portion 37 of the nut 3 completely enters inside of the joint main body 2 and becomes invisible from outside of the pipe joint 1. The operator checks whether the indicator portion 37 becomes completely invisible, such as to confirm completion of coupling of the metal flexible pipe. The indicator portion 37 is not limited to the dye painted on the outer surface of the nut that is screwed in to enter inside of the joint main body but may have a configuration shown in FIG. 4.

A2. Modifications of First Example

Figure 4:
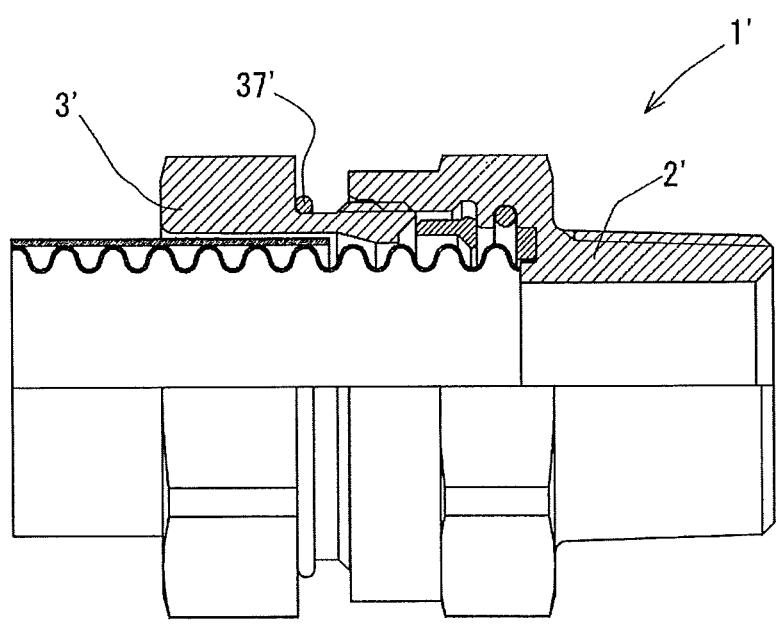
FIG. 4 is a sectional view illustrating a pipe joint according to a modification of the first example.
Figure 5:
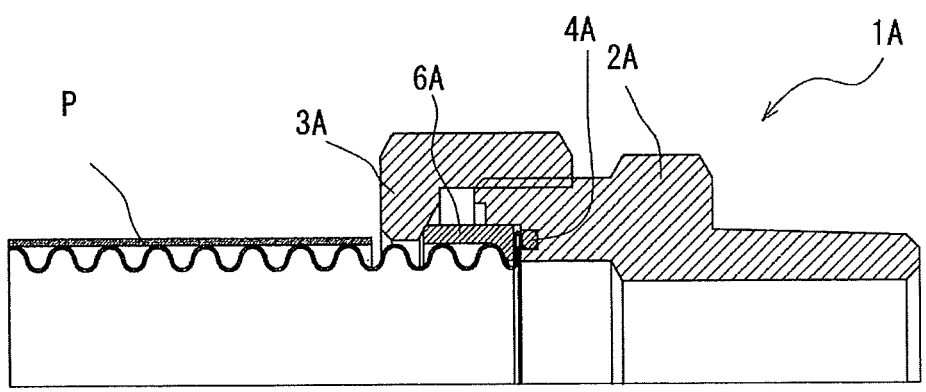
FIG. 5 is a sectional view illustrating a prior art pipe joint.

In a pipe joint 1' shown in FIG. 4, an O ring 37' is placed on an outer periphery of a nut 3' that is screwed in to enter inside of a joint main body. The color of the O ring 37' is set to a color readily recognizable from outside (for example, red color). When the metal flexible pipe P is coupled with the pipe joint 1', screwing the nut 3' in to abut against a joint main body 2' causes the O ring 37' to enter inside of the joint main body 2' and to become invisible from outside of the joint main body 2'. The operator checks whether the O ring 37' is visible from outside of the pipe joint, such as to confirm completion of coupling of the metal flexible pipe.

B. Second Example

B1. Configuration of Retainer

Figure 6:
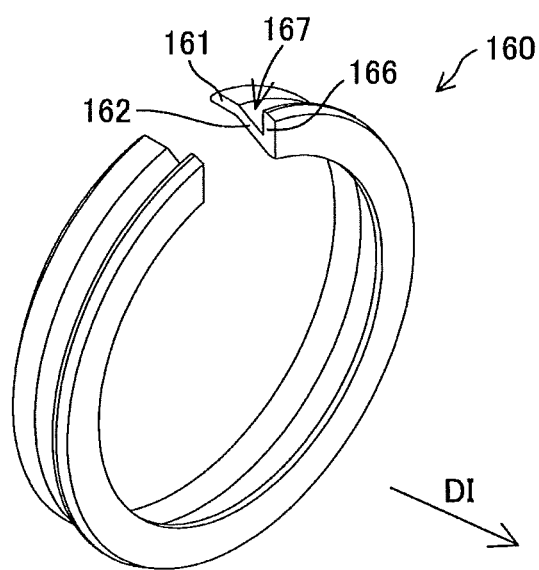
FIG. 6 is a perspective view illustrating a retainer used for a pipe joint according to a second example.
Figure 7:
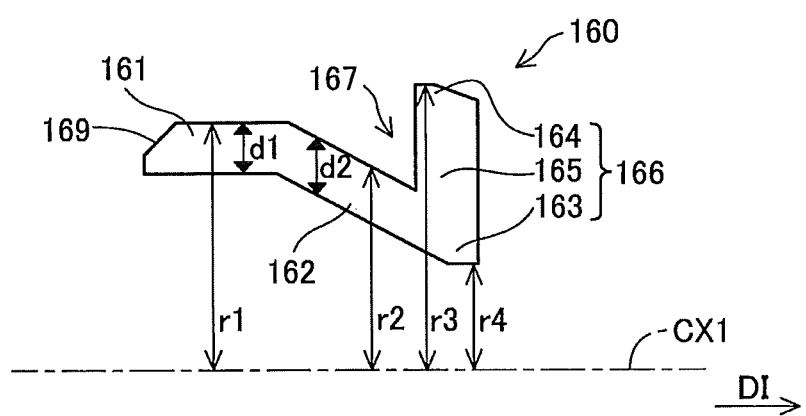
FIG. 7 is a sectional view illustrating the retainer according to the second example.

FIG. 6 is a perspective view illustrating a retainer 160 used for a pipe joint according to a second example. FIG. 7 is a sectional view illustrating the retainer 160 according to the second example. FIG. 7 illustrates an upper half section of the retainer 160 including a central axis line CX1. The central axis line CX1 of the retainer 160 is parallel to a screwing direction D1. The pipe joint of the second example differs from the pipe joint 1 of the first example by using the retainer 160 in place of the retainer 6. The other configuration of the pipe joint of the second example is similar to that of the pipe joint 1 of the first example. The like components are expressed by the like reference signs, and their detailed description is omitted.

The retainer 160 includes a leading end portion 166 that is located at a leading end in the screwing direction D1, a rear end portion 161 that is located at a rear end in the screwing direction D1, and a connecting portion 162 that is placed between the leading end portion 166 and the rear end portion 161 along the screwing direction D1 such as to connect the leading end portion 166 with the rear end portion 161.

As shown in FIG. 7, the leading end portion 166 includes a retainer locking portion 164, a pawl portion 163 and a standing portion 165. The retainer locking portion 164 is located on an outermost circumference side (side farthest away from the central axis line CX1) of the leading end portion 166 and serves like the convex portion 64 of the first example. The pawl portion 163 is located on an innermost circumference side (side nearest to the central axis line CX1) of the leading end portion 166 and serves like the pawl portion 63 of the first example. The standing portion 165 is extended in a direction perpendicular to the screwing direction D1, such as to connect the retainer locking portion 164 with the pawl portion 163.

The rear end portion 161 includes a tapered surface 169 on a rearmost end. This tapered surface 169 abuts against the tapered surface 32 of the nut 3 when the nut 3 is screwed in. A remaining part of the rear end portion 161 other than a part where the tapered surface 169 described above is formed is extended parallel to the screwing direction D1. The thickness of this remaining part in a direction orthogonal to the screwing direction D1 (hereinafter called "orthogonal direction") is a uniform thickness d1 along the screwing direction D1.

The connecting portion 162 has an inner diameter and an outer diameter that are reduced along the screwing direction toward its leading end side. The thickness of the connecting portion 162 in the orthogonal direction is a uniform thickness d2 along the screwing direction D1. According to this example, the thickness d2 of the connecting portion 162 is equal to the thickness d1 of the rear end portion 161. The leading end of the connecting portion 162 is continuous with an edge portion of the leading end portion 166 on a side near to the central axis line CX1 along the orthogonal direction, i.e., with the pawl portion 163.

A distance r3 from the central axis line CX1 to an end in an outer diameter direction of the leading end portion 166 (hereinafter referred to as "outer diameter end") or more specifically to an outer diameter end of the retainer locking portion 164 is longer than a distance r1 from the central axis line CX1 to an outer diameter end of the rear end portion 161. A distance r2 between an outer diameter end of a remaining part of the connecting portion 162 other than a part continuous with the rear end portion 161 and the center axis line CX1 is shorter than the distance r1 from the center axis line CX1 to the outer diameter end of the rear end portion 161.

The configuration of the retainer 160 is restated as follows, based on the configuration of the leading end portion 166, the rear end portion 161 and the connecting portion 162 described above. A groove 167 is formed in part of the entire circumference of the retainer 160 about the central axis line CX1 to be placed between the leading end portion 166 and the rear end portion 161 along the screwing direction D1 and to be recessed in a depth direction that is a direction intersecting with the screwing direction D1.

An inner diameter of the leading end portion 166 shown in FIG. 7 or more specifically an inner diameter r4 of the pawl portion 163 is smaller than the inner diameter of the pawl portion 63 of the first example. A locking margin between the pawl portion 163 and the metal flexible pipe P (length in a direction orthogonal to the central axis line of an overlap region where a crest of the metal flexible pipe P overlaps with the retainer 160 in the screwing direction D1)

is larger than the locking margin of the first example. This configuration suppresses the metal flexible pipe P from coming off during the pulling check operation described above. The groove 167 is, on the other hand, formed in the retainer 160 to be recessed in the depth direction that is the direction intersecting with the screwing direction D1. This configuration reduces the rigidity of the retainer 160, compared with a configuration without such a groove 167. This configuration accordingly reduces the resistance during insertion of the metal flexible pipe P into the pipe joint and thereby suppresses reduction of the insertability of the metal flexible pipe P.

B2. Procedure of Coupling Metal Flexible Pipe with Pipe Joint

Figure 8:
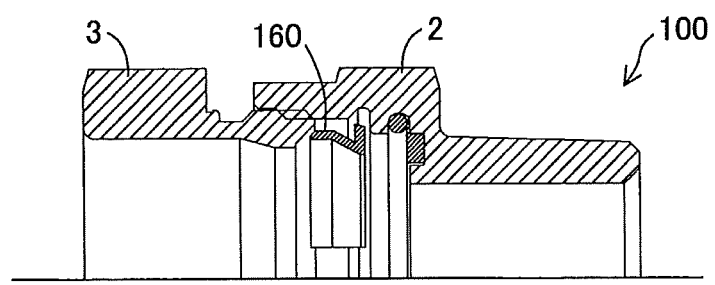
FIG. 8 is a sectional view illustrating a procedure of coupling the metal flexible pipe with the pipe joint according to the second example.
Figure 9:
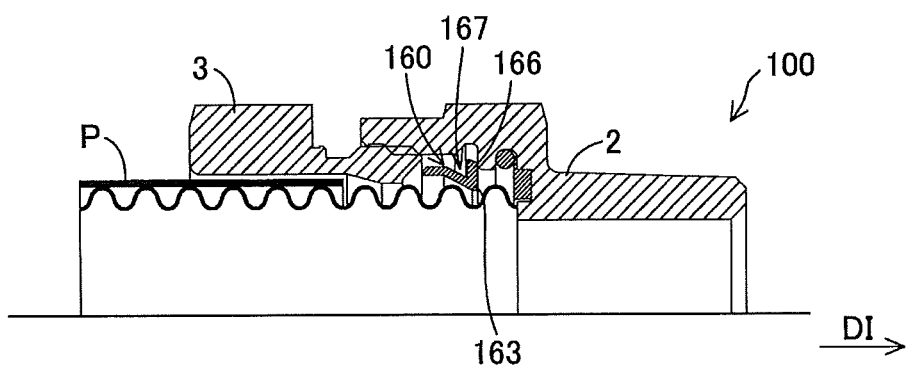
FIG. 9 is a sectional view illustrating the procedure of coupling the metal flexible pipe with the pipe joint according to the second example.
Figure 10:
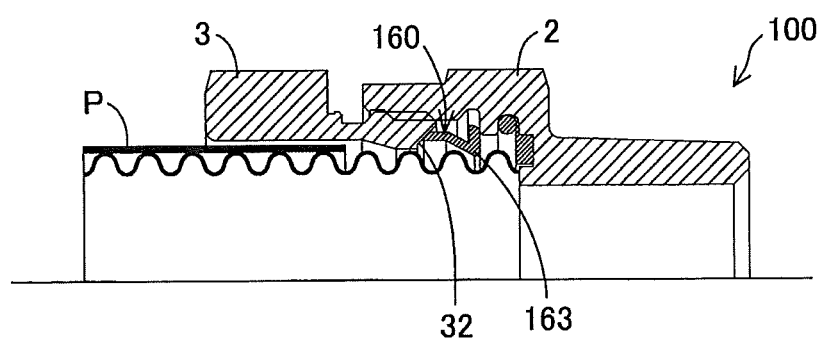
FIG. 10 is a sectional view illustrating the procedure of coupling the metal flexible pipe with the pipe joint according to the second example.
Figure 11:
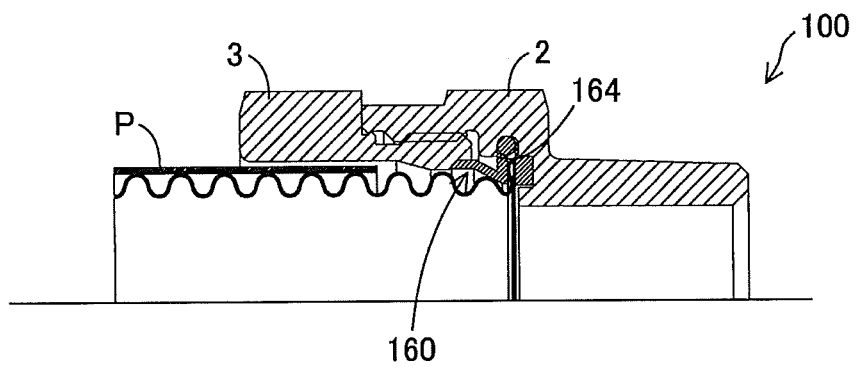
FIG. 11 is a sectional view illustrating the procedure of coupling the metal flexible pipe with the pipe joint according to the second example.

A procedure of coupling the metal flexible pipe P with the pipe joint of the second example is described with reference to FIGS. 8 to 11. FIG. 8 illustrates a state corresponding to FIG. 3A of the first example. FIG. 9, FIG. 10 and FIG. 11 respectively illustrate a state corresponding to FIG. 3B of the first example, a state corresponding to FIG. 3C of the first example, and a state corresponding to FIG. 3E of the first example. The following describes in detail only the procedure different from the first example, and the description of the other procedure may be omitted or simplified.

As shown in FIG. 8, a pipe joint 100 of the second example assembled from the respective members is provided, and a device used to install the metal flexible pipe P is mounted to the joint main body 2-side.

As shown in FIG. 9, the metal flexible pipe P is inserted from the nut 3-side into the pipe joint 100. The configuration of this example provides the larger locking margin between the pawl portion 163 and the metal flexible pipe P (crest) compared to the configuration of the first example, but reduces the rigidity of the retainer 160 by the presence of the groove 167. This configuration enables the pawl portion 163 to be elastically expanded when one crest of the leading end of the metal flexible pipe P comes into contact with the pawl portion 163. One crest of the leading end of the metal flexible pipe P accordingly rides over the pawl portion 163 and moves toward the leading end side in the screwing direction D1.

According to this example, the pulling check operation is performed in the state of FIG. 9. In this operation, the metal flexible pipe P is pulled in the opposite direction to the screwing direction D1 by a smaller force than the force applied to insert the metal flexible pipe P. The configuration of this example provides the larger locking margin between the pawl portion 163 and the metal flexible pipe P (crest) compared with the configuration of the first example. Even when the metal flexible pipe P is pulled in the opposite direction to the screwing direction D1, one crest of the leading end of the metal flexible pipe P fails to ride over the pawl portion 163. This configuration suppresses the metal flexible pipe P from being disconnected from (coming off from) the pipe joint 100.

After that, as shown in FIG. 10, when the nut 3 is screwed into the joint main body 2, the retainer 160 (its rear end portion 161) is deformed along the tapered surface 32 of the nut 3 to reduce the diameter, and the pawl portion 163 is engaged with a first trough from the leading end of the metal flexible pipe P. When the nut 3 is further screwed in such as to complete coupling (to provide the coupled state), as shown in FIG. 11, one crest of the leading end of the metal flexible pipe P is crushed by the retainer 160. The retainer locking portion 164 of the leading end portion 166 is then caught and locked by the locking groove 24 of the joint main body 2. This configuration provides the state that coupling of the metal flexible pipe P with the pipe joint 100 is not readily released.

In the pipe joint 100 of the second example described above, the groove 167 is formed in at least part of the entire circumferential direction on the outer circumferential surface side to be placed between the leading end portion 166 and the rear end portion 161 along the screwing direction D1 and to be recessed in the depth direction that is the direction intersecting with the screwing direction D1. This configuration reduces the rigidity between the leading end portion 166 and the rear end portion 161, compared with a configuration without such a groove 167. This configuration accordingly reduces the resistance during insertion of the metal flexible pipe P into the pipe joint 100, irrespective of further reduction of the inner diameter r4 of the pawl portion 163 in order to suppress the metal flexible pipe P from being disconnected from the pipe joint 100. This configuration thus enhances the insertability of the metal flexible pipe P into the pipe joint 100, while suppressing coupling of the metal flexible pipe P with the pipe joint 100 from being released.

With regard to at least part of the connecting portion 162 along the screwing direction D1 (i.e., remaining part other than the part that is adjacent to the rear end portion 161), the distance r2 from the central axis line CX1 to the outer diameter end of the connecting portion 162 is shorter than the distance r1 from the central axis line CX1 to the outer diameter end of the rear end portion 161. This configuration reduces the rigidity of the connecting portion 162, compared with a configuration that the distance r2 is equal to or longer than the distance r1.

The distance d2 of the connecting portion 162 in the orthogonal direction is uniform along the screwing direction D1. This configuration suppresses a stress from being concentrated in a specific region of the connecting portion 162 in the process of coupling the metal flexible pipe P with the pipe joint 100. This configuration accordingly suppresses damage of the retainer 160. The thickness d2 of the connecting portion 162 in the orthogonal direction may be set to a uniform, smallest possible thickness in a processible range that provides such a rigidity as to crush one crest of the leading end side of the metal flexible pipe P. This minimizes the rigidity of the connecting portion 162 in the processible range that provides the rigidity described above.

The thickness d2 of the connecting portion 162 in the orthogonal direction is equal to the thickness d1 of the rear end portion 161 in the orthogonal direction. This configuration suppresses a stress from being concentrated in a specific region from the rear end portion 161 to the connecting portion 162 or more specifically in a region having the smaller thickness in the orthogonal direction than the remaining region in the process of coupling the metal flexible pipe P with the pipe joint 100. This configuration accordingly suppresses damage of the retainer 160.

The leading end of the connecting portion 162 is continuous with the edge portion of the leading end portion 166 on the side near to the central axis line CX1 along the orthogonal direction, i.e., with the pawl portion 163. This configuration further increases the size (volume) of the groove 167 formed in the retainer 160 between the leading end portion 166 and the rear end portion 161 along the screwing direction D1, compared to a configuration that the leading end of the connecting portion 162 is continuous with a portion different from the edge portion of the leading end portion 166 on the side near to the central axis line CX1 along the orthogonal direction. This configuration accordingly further reduces the rigidity of the retainer 160.

C. Third Example

C1. Configuration of Retainer

Figure 12:
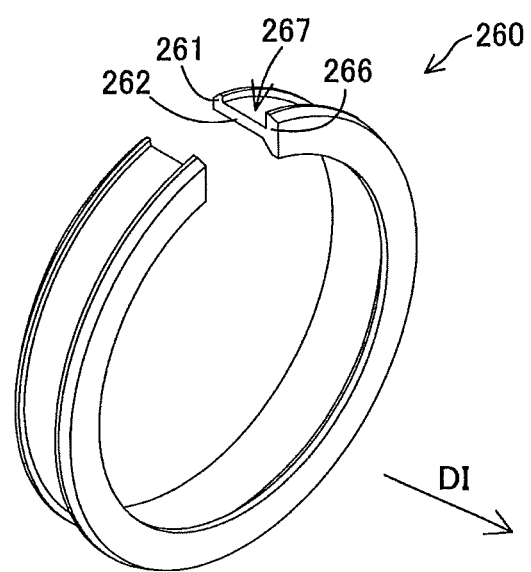
FIG. 12 is a perspective view illustrating a retainer used for a pipe joint according to a third example.
Figure 13:
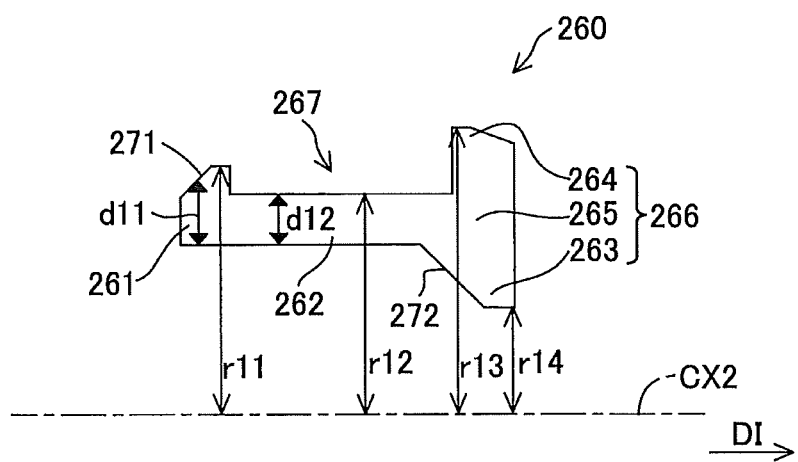
FIG. 13 is a sectional view illustrating the retainer according to the third example.

FIG. 12 is a perspective view illustrating a retainer 260 used for a pipe joint according to a third example. FIG. 13 is a sectional view illustrating the retainer 260 according to the third example. FIG. 13 illustrates an upper half section of the retainer 260 including a central axis line CX2. The central axis line CX2 of the retainer 260 is parallel to a screwing direction D1. The pipe joint of the third example differs from the pipe joint 100 of the second example by using the retainer 260 in place of the retainer 160. The other configuration of the pipe joint of the third example is similar to that of the pipe joint 100 of the second example. The like components are expressed by the like reference signs, and their detailed description is omitted.

The retainer 260 includes a leading end portion 266 that is located on a leading end side in the screwing direction D1, a rear end portion 261 that is located on a rear end side in the screwing direction D1, and a connecting portion 262 that is placed between the leading end portion 266 and the rear end portion 261 along the screwing direction D1 such as to connect the leading end portion 266 with the rear end portion 261.

The leading end portion 266 includes a retainer locking portion 264, a pawl portion 263 and a standing portion 265. The retainer locking portion 264 serves like the retainer locking portion 164 of the second example. Similarly the pawl portion 263 and the standing portion 265 respectively serve like the pawl portion 163 of the second example and like the standing portion 165 of the second example.

The rear end portion 261 of the third example differs from the rear end portion 161 of the second example by the smaller size of a part located on the leading end side of a tapered surface 271. The thickness in the orthogonal direction of the rear end portion 261 of the third example has an average value d11 along the screwing direction D1 that is larger than the thickness d1 of the rear end portion 161 of the second example.

The connecting portion 262 of the third example differs from the connecting portion 162 of the second example by that a tapered surface 272 is formed on an inner circumference side of a leading end side to be continuous with an inner circumferential surface of the pawl portion 263 and that the inner diameter and the outer diameter are uniform with regard to a remaining part other than a part where the tapered surface 272 is formed. The other configuration of the connecting portion 262 of the third example is similar to that of the connecting portion 162 of the second example. The tapered surface 272 formed on the inner circumference side of the leading end side of the connecting portion 262 is a surface that is tapered to gradually reduce the inner diameter toward the leading end along the screwing direction D1. A distance d12 in the orthogonal direction of the remaining part of the connecting portion 262 other than this tapered surface 272 is smaller than the average thickness d11 in the orthogonal direction of the rear end portion 261.

The relationship of the distances from the central axis line CX2 to the respective outer diameter ends of the rear end portion 261, the connecting portion 262 and the leading end portion 266 is similar to the relationship of the second example. More specifically, a distance r13 from the center axis line CX2 to an outer diameter end of the leading end portion 266 is longer than a distance r11 from the center axis line CX2 to an outer diameter end of the rear end portion 261. A distance r12 from the central axis line CX2 to an outer diameter end of the connecting portion 262 is shorter than the distance r11 from the central axis line CX2 to the outer diameter end of the rear end portion 261.

Like the retainer 160 of the second example, the configuration of the retainer 260 of the third example is restated as follows, based on the configuration of the leading end portion 266, the rear end portion 261 and the connecting portion 262 described above. A groove 267 is formed on an outer circumferential surface side in part of the entire circumference of the retainer 260 about the central axis line CX2 to be placed between the leading end portion 266 and the rear end portion 261 along the screwing direction D1 and to be recessed in the depth direction that is the direction intersecting with the screwing direction D1.

The inner diameter of the leading end portion 266 shown in FIG. 13 or more specifically the inner diameter r14 of the pawl portion 263 is smaller than the inner diameter of the pawl portion 63 of the first example. This configuration provides the larger locking margin between the pawl portion 263 and the metal flexible pipe P than the configuration of the first example. This configuration accordingly more effectively suppresses the metal flexible pipe P from being disconnected during the pulling check operation, like the second example. The retainer 260 is provided with the groove 267 formed to be recessed in the depth direction that is the direction intersecting with the screwing direction D1 and accordingly has a small thickness (i.e., is thin). This configuration reduces the rigidity of the retainer 260, compared with the configuration without such a groove 267. This configuration thus reduces the resistance during insertion of the metal flexible pipe P into the pipe joint and suppresses reduction of the insertability of the metal flexible pipe P, irrespective of the large locking margin.

C2. Procedure of Coupling Metal Flexible Pipe with Pipe Joint

Figure 14:
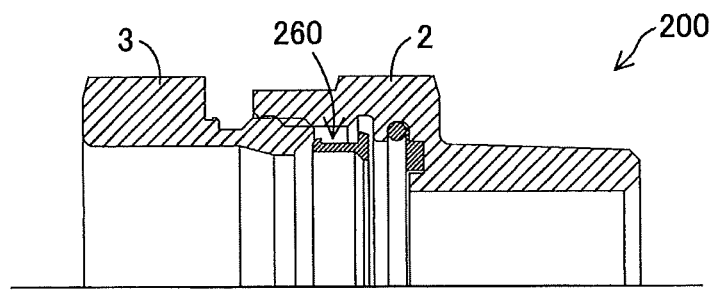
FIG. 14 is a sectional view illustrating a procedure of coupling the metal flexible pipe with the pipe joint according to the third example.
Figure 15:
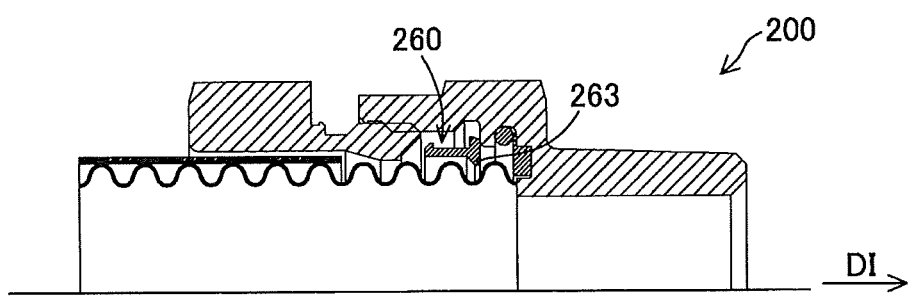
FIG. 15 is a sectional view illustrating the procedure of coupling the metal flexible pipe with the pipe joint according to the third example.
Figure 16:
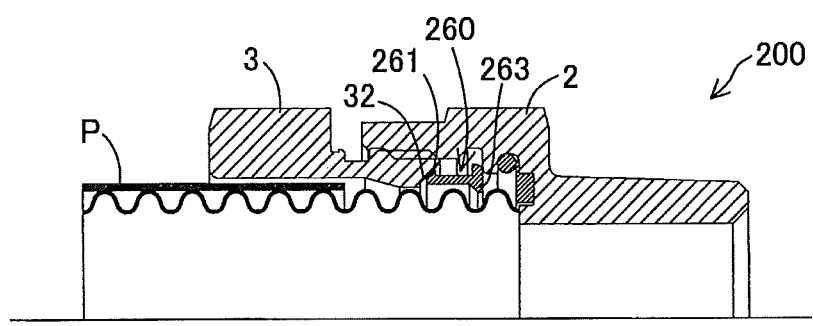
FIG. 16 is a sectional view illustrating the procedure of coupling the metal flexible pipe with the pipe joint according to the third example.
Figure 17:
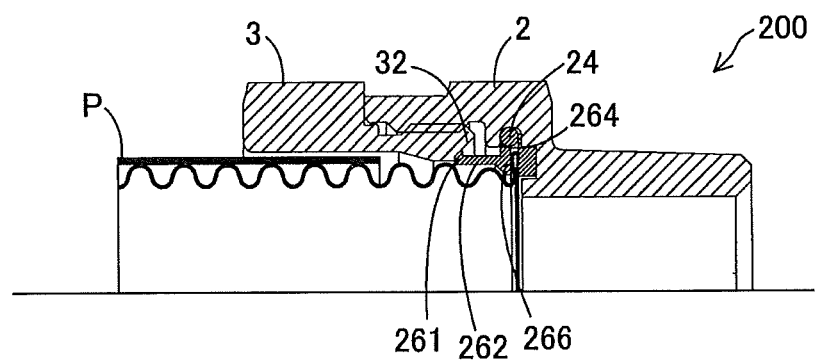
FIG. 17 is a sectional view illustrating the procedure of coupling the metal flexible pipe with the pipe joint according to the third example.

A procedure of coupling the metal flexible pipe P with the pipe joint of the third example is described with reference to FIGS. 14 to 17. FIG. 14 illustrates a state corresponding to FIG. 8 of the second example. FIG. 15, FIG. 16 and FIG. 17 respectively illustrate a state corresponding to FIG. 9 of the second example, a state corresponding to FIG. 10 of the second example, and a state corresponding to FIG. 11 of the second example. In the description below, the same procedure as the procedure of the second example may be omitted or simplified.

As shown in FIG. 14, a pipe joint 200 of the third example assembled from the respective members is provided, and a device used to install the metal flexible pipe P is mounted to the joint main body 2-side.

As shown in FIG. 15, the metal flexible pipe P is inserted from the nut 3-side into the pipe joint 200. The leading end of the metal flexible pipe P abuts against the tapered surface 272 of the retainer 260 and is then inserted along the tapered surface 272 in the screwing direction D1. The retainer 260 receives a force outward in the radial direction from the metal flexible pipe P, such as to increase its diameter. The configuration of this example provides the larger locking margin between the pawl portion 263 and the metal flexible pipe P (crest) compared with the configuration of the first example but reduces the rigidity of the retainer 260 by the presence of the groove 267. This configuration enables the pawl portion 263 to be elastically expanded when one crest of the leading end of the metal flexible pipe P comes into contact with the pawl portion 263. One crest of the leading end of the metal flexible pipe P accordingly rides over the pawl portion 263 and moves toward the leading end side in the screwing direction D1.

According to this example, the pulling check operation is performed in the state of FIG. 15. In this operation, the metal flexible pipe P is pulled in the opposite direction to the screwing direction D1 by a smaller force than the force applied to insert the metal flexible pipe P. The configuration of this example also provides the larger locking margin between the pawl portion 263 and the metal flexible pipe P (crest) compared with the configuration of the first example. Even when the metal flexible pipe P is pulled in the opposite direction to the screwing direction D1, one crest of the leading end of the metal flexible pipe P fails to ride over the pawl portion 263. This configuration suppresses the metal flexible pipe P from being disconnected from the pipe joint 200.

After that, as shown in FIG. 16, when the nut 3 is screwed into the joint main body 2, the retainer 260 (its rear end portion 261) is deformed along the tapered surface 32 of the nut 3 to reduce the diameter, and the pawl portion 263 is engaged with a first trough from the leading end of the metal flexible pipe P. When the nut 3 is further screwed in to complete coupling (to provide the coupled state), as shown in FIG. 17, one crest of the leading end of the metal flexible pipe P is crushed by the retainer 260. The retainer locking portion 264 of the leading end portion 266 is then caught and locked by the locking groove 24 of the joint main body 2. This configuration provides the state that coupling of the metal flexible pipe P with the pipe joint 200 is not readily released. In this state, the tapered surface 272 formed on the leading end side and the inner circumference side of the connecting portion 262 does not come into contact with an inclined surface of a crest of the metal flexible pipe P. In other words, the angle of the tapered surface 272 formed on the leading end side and the inner circumferential surface side of the connecting portion 262 is set to an angle that does not interfere with the inclination of the crest of the metal flexible pipe P in the state that coupling of the metal flexible pipe P with the pipe joint 200 is completed.

The pipe joint 200 of the third example described above has the similar advantageous effects to those of the pipe joint 100 of the second example.

D. Fourth Example

D1. Configuration of Pipe Joint

Figure 18:
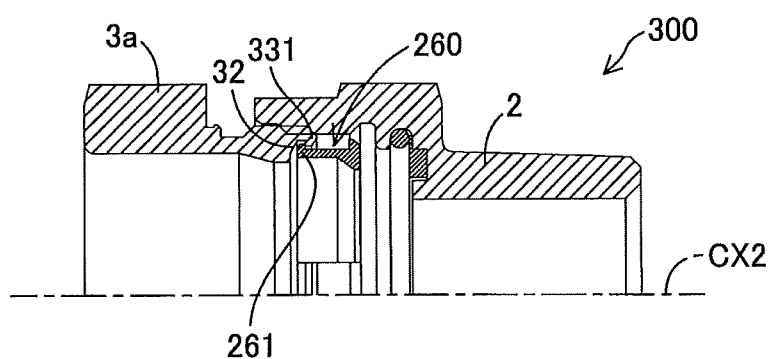
FIG. 18 is a sectional view illustrating the schematic configuration of a pipe joint according to a fourth example.

FIG. 18 is a sectional view illustrating the schematic configuration of a pipe joint according to a fourth example. As a matter of convenience, FIG. 18 illustrates an upper half of a section of a pipe joint 300 including the central axis line CX2 of the retainer 260. FIG. 18 illustrates the state of the pipe joint 300 before the metal flexible pipe P is coupled with the pipe joint 300. The pipe joint 300 of the fourth example differs from the pipe joint 200 of the third example by that a nut 3a is provided in place of the nut 3 and that the retainer 260 and the nut 3a are assembled to and integrated with each other before the nut 3a is screwed into the joint main body 2. The other configuration of the pipe joint 300 of the fourth example is similar to that of the pipe joint 200 of the third example. The like components are expressed by the like reference signs, and their detailed description is omitted.

As shown in FIG. 18, an engagement element 331 is formed on an inner circumference side of a leading end of the nut 3a. The engagement element 331 is placed on a leading end side and an outer diameter end side of the tapered surface 32 and is protruded in the screwing direction D1. A leading end portion of the engagement element 331 is formed to have a larger thickness in the orthogonal direction than a base end portion of the engagement element 331. Accordingly, a ring-shaped groove is formed in the base end portion of the engagement element 331 to be recessed in a depth direction that is the orthogonal direction. In the state of FIG. 18, the rear end portion 261 of the retainer 260 is engaged with this groove.

D2. Procedure of Coupling Metal Flexible Pipe with Pipe Joint

Figure 19:
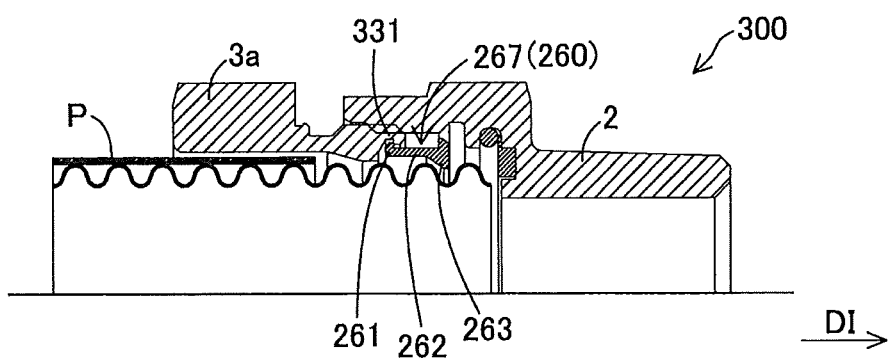
FIG. 19 is a sectional view illustrating a procedure of coupling the metal flexible pipe with the pipe joint according to the fourth example.
Figure 20:
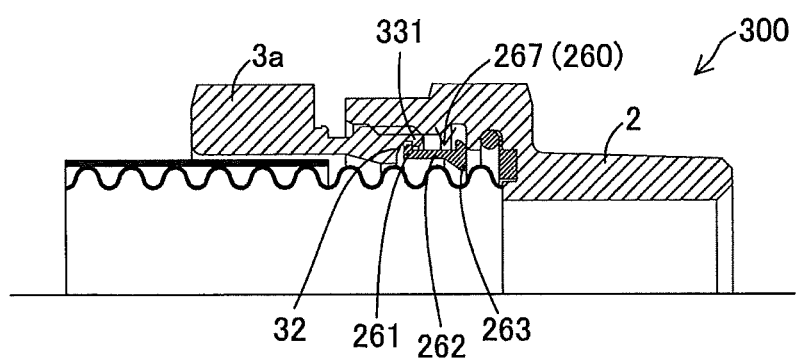
FIG. 20 is a sectional view illustrating the procedure of coupling the metal flexible pipe with the pipe joint according to the fourth example.
Figure 21:
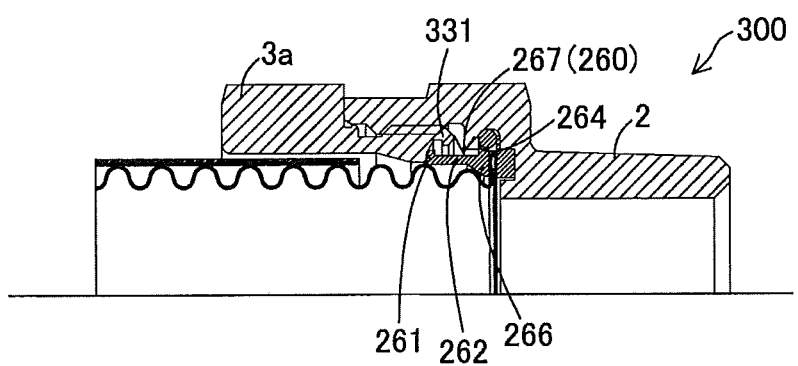
FIG. 21 is a sectional view illustrating the procedure of coupling the metal flexible pipe with the pipe joint according to the fourth example.

A procedure of coupling the metal flexible pipe P with the pipe joint of the fourth example is described with reference to FIGS. 19 to 21 and FIG. 18 described above. FIG. 18 illustrates a state corresponding to FIG. 14 of the third example. FIG. 19, FIG. 20 and FIG. 21 respectively illustrate a state corresponding to FIG. 15 of the third example, a state corresponding to FIG. 16 of the third example, and a state corresponding to FIG. 17 of the third example. In the description below, the same procedure as the procedure of the third example may be omitted or simplified.

As shown in FIG. 18, the pipe joint 300 of the third example assembled from the respective members is provided, and a device used to install the metal flexible pipe P is mounted to the joint main body 2-side. In the state prior to the state of FIG. 18, i.e., before the nut 3a is screwed into the joint main body 2, the rear end portion 261 of the retainer 260 is engaged in advance with the engagement element 331 of the nut 3a. In the process of screwing the nut 3a into the joint main body 2 and in the state of FIG. 18, this configuration suppresses a positional misalignment of the retainer 260 even when the orientation of the pipe joint 300 is changed, for example, even when the pipe joint 300 is rotated by 90 degrees from the state of FIG. 18 to change its orientation such that the central axis line CX2 becomes parallel to the vertical direction. This configuration accordingly reduces the labor required for the operation of coupling the metal flexible pipe P with the pipe joint 300 and shortens the operation time. Additionally, the rear end portion 261 of the retainer 260 is engaged in advance with the engagement element 331 of the nut 3a before the nut 3a is screwed into the joint main body 2. In other words, the retainer 260 and the nut 3a are assembled to and integrated with each other before the nut 3a is screwed into the joint main body 2. This configuration suppresses the occurrence of a mounting failure of the retainer 260 and an assembling error of the retainer 260 in the process of screwing the nut 3a into the joint main body 2.

As shown in FIG. 19, the metal flexible pipe P is inserted from the nut 3-side into the pipe joint 300. The configuration of this example provides the larger locking margin between the pawl portion 263 and the metal flexible pipe P (crest) compared with the configuration of the first example but reduces the rigidity of the retainer 260 by the presence of the groove 268. This configuration enables the pawl portion 263 to be elastically expanded when one crest of the leading end of the metal flexible pipe P comes into contact with the pawl portion 263. One crest of the leading end of the metal flexible pipe P accordingly rides over the pawl portion 263 and moves toward the leading end side in the screwing direction D1.

According to this example, the pulling check operation is performed in the state of FIG. 19. In this operation, the metal flexible pipe P is pulled in the opposite direction to the screwing direction D1 by a smaller force than the force applied to insert the metal flexible pipe P. The configuration of this example also provides the larger locking margin between the pawl portion 263 and the metal flexible pipe P (crest) compared with the configuration of the first example. Even when the metal flexible pipe P is pulled in the opposite direction to the screwing direction D1, one crest of the leading end of the metal flexible pipe P fails to ride over the pawl portion 263. This configuration suppresses the metal flexible pipe P from being disconnected from the pipe joint 300.

After that, as shown in FIG. 20, when the nut 3 is screwed into the joint main body 2, the retainer 260 (its rear end portion 261) is deformed along the tapered surface 32 of the nut 3 to reduce the diameter, and the pawl portion 263 is engaged with a first trough from the leading end of the metal flexible pipe P. When the nut 3 is further screwed in such as to complete coupling (to provide the coupled state), as shown in FIG. 21, one crest of the leading end of the metal flexible pipe P is crushed by the retainer 260. The retainer locking portion 264 of the leading end portion 266 is then caught and locked by the locking groove 24 of the joint main body 2. This configuration provides the state that coupling of the metal flexible pipe P with the pipe joint 300 is not readily released.

The pipe joint 300 of the fourth example described above provides similar advantageous effects to those of the pipe joint 200 of the third example. Additionally, the rear end portion 261 of the retainer 260 is engaged in advance with the engagement element 331 of the nut 3a before the nut 3a is screwed into the joint main body 2. In other words, the retainer 260 and the nut 3a are assembled to and integrated with each other before the nut 3a is screwed into the joint main body 2. In the process of screwing the nut 3a into the joint main body 2 and in the state that the nut 3a is screwed, this configuration suppresses a positional misalignment of the retainer 260 even when the orientation of the pipe joint 300 is changed. This configuration accordingly reduces the labor required for the operation of coupling the metal flexible pipe P with the pipe joint 300 and shortens the operation time. This configuration also suppresses the occurrence of a mounting failure of the retainer 260 and an assembling error of the retainer 260 in the process of screwing the nut 3a into the joint main body 2.

E. Modifications

E1. Modification 1

According to the respective examples, all the retainers 6, 160 and 260 have the partly cut appearance shape that part of the entire circumference is cut in the circumferential direction. Alternatively, the retainer 6, 160 or 260 may be formed to have a fully annular appearance shape without any cut portion. In general, a pipe joint including a retainer that has a common central axis line with the joint main body 2 and provides an annular appearance shape forming at least part of the entire circumference in the circumferential direction about the central axis line may be applied to the pipe joint of the present disclosure.

E2. Modification 2

According to the second example, the leading end of the connecting portion 162 is continuous with the edge portion of the leading end portion 166 on the side near to the central axis line CX1 along the orthogonal direction, i.e., the pawl portion 163. The leading end of the connecting portion 162 may, however, be continuous with the standing portion 165, instead of the pawl portion 163.

E3. Modification 3

According to the second example, the thickness in the orthogonal direction of the connecting portion 162 is uniform along the screwing direction D1. This disclosure is, however, not limited to this configuration. The thickness may be gradually decreased along the screwing direction D1 toward the leading end side. On the contrary, the thickness may be gradually increased along the screwing direction D1 toward the leading end side.

The invention claimed is:

1. A pipe joint coupled to a metal flexible pipe comprising:
   a hollow joint main body;
   a nut screwed into the joint main body by a threaded connection;
   a seal member mounted inside of the joint main body; and
   a retainer placed between the joint main body and the nut, wherein the retainer comprises:
      a pawl portion engaged with a trough of the metal flexible pipe in a coupled state that the metal flexible pipe is coupled with the pipe joint by further screwing the nut into the joint main body; and
      a retainer locking portion 1) caught and locked inside of the joint main body in the coupled state, and 2) not caught and locked inside of the joint main body when not in the coupled state, and
   wherein a status of the retainer locking portion changes from a status that the retainer locking portion is not caught inside of the joint main body to a status that the retainer locking portion is caught inside of the joint main body by movement of the retainer locking portion along a screwing direction in which the nut is screwed into the joint main body by screwing the nut into the joint main body,
   the retainer locking portion is caught and locked by a locking groove formed in an inner surface of the joint main body in the coupled state,
   the retainer has a central axis line common with the joint main body and provides an annular appearance shape that forms at least part of an entire circumference in a circumferential direction about the central axis line,
   the retainer comprises a leading end portion located on a leading end side along a screwing direction in which the nut is screwed into the joint main body and that includes the pawl portion and the retainer locking portion, and a rear end portion located on a rear end side along the screwing direction,
   the retainer locking portion includes a tapered portion and a step portion, the tapered portion being tapered along the screwing direction toward the leading end, and the step portion is continuous from a rear end of the tapered portion and perpendicular to the radial direction,
   the tapered portion and the step portion are formed on an outer circumference surface of the retainer, and
   an outer diameter of the tapered portion gradually decreases along the screwing direction.

2. The pipe joint according to claim 1, wherein
   the locking groove is formed in an inner circumferential surface of the joint main body, and the retainer locking portion is configured as a convex portion that is caught and locked in the locking groove in the coupled state.

3. The pipe joint according claim 2, wherein the retainer and the nut are assembled to and integrated with each other before the nut is further screwed into the joint main body.

4. The pipe joint according claim 2, wherein
the joint main body includes a body locking portion,
the nut includes a nut locking portion, and
the body locking portion and the nut locking portion are caught and locked by each other in the coupled state.

5. The pipe joint according to claim 2, wherein a convex portion of the retainer is in contact with the locking groove on the joint main body in an opposite direction to the screwing direction in which the nut is screwed into the joint main body in the coupled state.

6. The pipe joint according to claim 1, wherein the retainer and the nut are assembled to and integrated with each other before the nut is further screwed into the joint main body.

7. The pipe joint according to claim 1, wherein
the joint main body includes a body locking portion,
the nut includes a nut locking portion, and
the body locking portion and the nut locking portion are caught and locked by each other in the coupled state.

8. A pipe joint coupled to a metal flexible pipe comprising:
a hollow joint main body;
a nut screwed into the joint main body by a threaded connection;
a seal member mounted inside of the joint main body; and
a retainer placed between the joint main body and the nut, wherein the retainer comprises:
a pawl portion engaged with a trough of the metal flexible pipe in a coupled state that the metal flexible pipe is coupled with the pipe joint by further screwing the nut into the joint main body; and
a retainer locking portion 1) caught and locked inside of the joint main body in the coupled state, and 2) not caught and locked inside of the joint main body when not in the coupled state, and
wherein a status of the retainer locking portion changes from a status that the retainer locking portion is not caught inside of the joint main body to a status that the retainer locking portion is caught inside of the joint main body by movement of the retainer locking portion along a screwing direction in which the nut is screwed into the joint main body by screwing the nut into the joint main body, wherein
the retainer locking portion is caught and locked by a locking groove formed in an inner surface of the joint main body in the coupled state,
the retainer has a central axis line common with the joint main body and provides an annular appearance shape that forms at least part of an entire circumference in a circumferential direction about the central axis line, and
the retainer comprises: a leading end portion located on a leading end side along a screwing direction in which the nut is screwed into the joint main body and that includes the pawl portion and the retainer locking portion; a rear end portion located on a rear end side along the screwing direction;
a distance from the central axis line to an outer diameter end of the leading end portion is longer than a distance from the central axis line to an outer diameter end of the rear end portion,
the retainer locking portion includes a tapered portion and a step portion, the tapered portion being tapered along the screwing direction toward the leading end, and the step portion is continuous from a rear end of the tapered portion and perpendicular to the radial direction,
the tapered portion and the step portion are formed on an outer circumference surface of the retainer, and
an outer diameter of the tapered portion gradually decreases along the screwing direction.

* * * * *